UNITED STATES PATENT OFFICE.

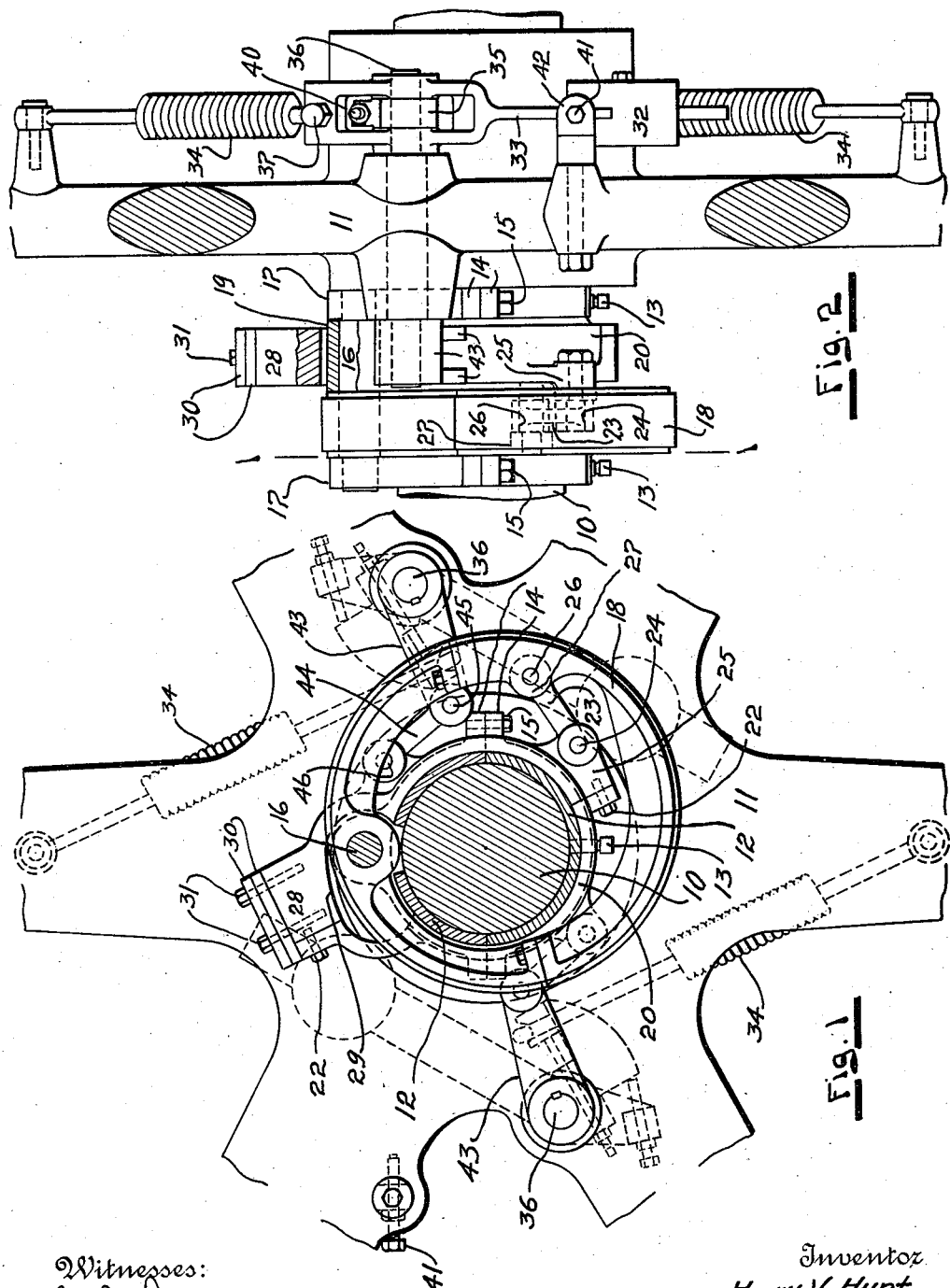

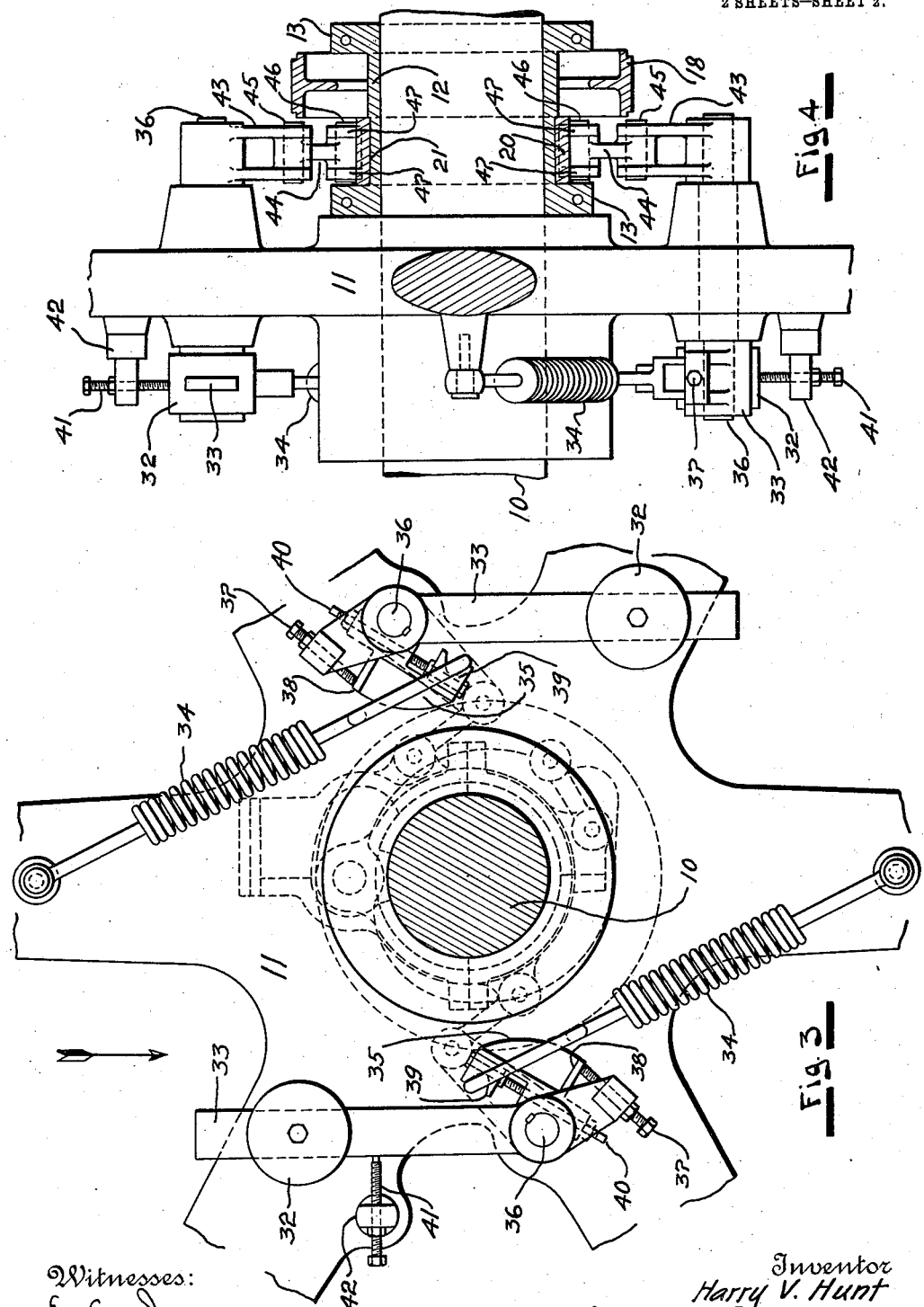

HARRY V. HUNT, OF JERSEY CITY, NEW JERSEY.

GOVERNOR.

1,014,754.   Specification of Letters Patent.   Patented Jan. 16, 1912.

Application filed April 22, 1911. Serial No. 622,723.

*To all whom it may concern:*

Be it known that I, HARRY V. HUNT, a citizen of the United States, and resident of Jersey City, in the county of Hudson and State of New Jersey, have invented certain new and useful Improvements in Governors, of which the following is a specification.

This invention relates to shaft governors.

Among the objects of the invention are, to render a compact device which will occupy as little space as possible between the bearings of the engine shaft; to provide for the convenient attachment of the device to the engine shaft and to provide a supporting sleeve that may be rotatably adjusted about the shaft and fixedly secured thereto, thereby avoiding machining the face of the fly-wheel hub and enabling any error in locating the fly-wheel on the shaft during the erection of the engine, to be easily rectified; to render all movements perfectly true and to guard against looseness and wabbling; to provide governor weight lever arms and spring lever arms which are angularly adjustable to each other, thus varying the tension of the springs; to provide novel means for varying the leverage of the springs; and in general to provide several useful features of construction.

With these objects in view, the invention consists in the parts, improvements and combinations of parts hereinafter described and pointed out in the claims, reference being had to the accompanying drawings which are hereby made a part of this specification and in which:—

Figure 1 is a partial section on the line 1—1 of Fig. 2. Fig. 2 is a side view of Fig. 1, portions thereof being shown in section.
Fig. 3 is a rear view of Fig. 1, and Fig. 4 is a plan view looking in the direction of the arrow Fig. 1.

In these views the numeral 10 represents the engine shaft and 11 the fly-wheel fixed thereon. At one side of the hub of the fly-wheel is a split sleeve 12, fixed to the shaft by means of set screws 13. Said sleeve 12 consists of two halves provided with bolt flanges 14 connected by bolts 15. The ends of a pivot pin 16 is carried in ears 17, formed with the extremities of the said fixed, but adjustable sleeve 12. To attain compactness, an eccentric ring 18 of light construction encircles the fixed sleeve 12.
Said eccentric 18 is provided with a long extension hub 19 which is mounted on the pin 16 between the ears 17. By this construction steadiness and increased bearing surface is obtained. By virtue of the fixed sleeve 12 being separate the fly-wheel hub does not need to be machined, and due to the adjustability of the said sleeve 12 any mistake in the erection of the fly-wheel may be easily corrected. A sleeve 20 is mounted rotatably on the fixed sleeve 12 at the inner side of the eccentric ring 18, preferably, on a recessed bearing surface 21 of smaller diameter than the outside of the sleeve 12. A link 23 connects the rotatable sleeve 20 with the eccentric 18 inside the latter. One end of said link 23 is pivoted on a pin 24 which is secured in a lug 25 that extends from one side of the said sleeve 20 near the outer edge thereof. The other end of the link 23 is pivoted on a pin 26 which is carried in an ear 27 that projects inside of the eccentric ring 18. The said link 23 lies approximately in the central plane of the said eccentric 18 and the pull exerted thereon is central and direct. Substantially on the other side from the lug 25 on the rotatable sleeve 20 in opposition to the over-balanced portion of the eccentric is a counter-weight 28. The attaching portions 28$^a$ and 28$^b$ between said counterweight 28 and the sleeve 20 are spaced providing a slotted opening 29 to permit free travel of the extension hub 19 therein. Supplementary weights 30 held by means of bolts 31 may be added to the outer end of the said counter-weight 28 to accurately balance the eccentric 18. The rotatable sleeve 20 and the counterweight 28 are preferably split, thereby affording convenient means for attaching and detaching them, independently of all of said other elements.

Governor weights 32 carried on lever arms 33 and springs 34 connected with lever arms 35 are mounted at the opposite side of the fly-wheel from the fixed and rotatable sleeves 12 and 20 respectively, and the eccentric 18. Due to this arrangement both accessibility and compactness are promoted; and the distance between the supporting bearings of the fly-wheel shaft may be shortened. The said weight lever arms 33 are keyed to one end of short shafts 36 which are journaled in and extending through the arms of the fly-wheel. The hub ends of these levers 33 are bifurcated to receive the said spring lever arms 35, which are mounted loosely on said short shafts 36. A set screw 37 threaded through the tail portion of each of the said weight levers 33 bears against a ledge 38 formed with the said spring levers 33 and constitutes an adjustable contact, which enables the tension on the springs 34 to be varied. The said springs 34, which it will be understood, oppose the weights 32 when the latter are acted upon by the centrifugal force, and these springs 34 are connected to adjustable anchorages 39 on the spring lever arms 35 so that the leverage of the said springs 34 may also be varied. Preferably each of the said anchorage blocks 39 are operated by a screw 40 which slides the block 31 on the face provided at one side of the spring lever arms 35. Set screws 41 complemented by jam-nuts are held in sockets 42 secured to the arm of the fly-wheel, said screws 41 constitute limiting stops for the outward movement of the governor weights 32. Link lever arms 43 are keyed to the other end of the short shafts 36 opposite to the weight lever arms 33. The outer ends of the said lever arms 43 may be bifurcated to receive one end of links 44 which are pivoted on pins 45 carried in these arms 43. The other end of said links 44 are pivotally connected to the rotatable sleeve 20 by means of pins 46 carried in ears 47 formed with the periphery of the said sleeve 20. These links are so arranged that their pull on the rotatable sleeve 20 is central and direct.

In operation, the governor weights 32 move outwardly under centrifugal force against the tension of the springs 34 as the speed increases, thus rocking the short shaft 36 which pulls the links 43 thereby rotating the sleeve 20. The latter transmits motion by means of the central link 23 to the eccentric 18 to produce a shorter cut-off thus reducing the speed of the engine. When the speed falls the springs move the parts in the opposite direction.

Having described my invention, what I desire to secure by Letters Patent and claim is:—

1. In a governor, the combination with a separately adjustable sleeve and means for fixing it on the shaft, of a ring encircling said fixed sleeve and having its pivotal axis located inside its contour, said ring constituting an eccentric, a second sleeve rotatable on said fixed sleeve, at one side of said eccentric ring, governor weights pivotally supported, independently of said fixed sleeve, connections between said weights and the rotatable sleeve and a connection between said rotatable sleeve and eccentric ring.

2. In a governor, the combination with a shaft and a fixed flywheel thereon, of a split sleeve distinct from the flywheel, means for adjustably securing said sleeve to the shaft, a second split sleeve rotatable on said fixed sleeve, a ring encircling said fixed sleeve at one side of said rotatable sleeve, said ring having its pivotal axis internally of its contour and constituting an eccentric, governor weights and arms pivotally supported by the fly-wheel, link connections between said arms and the rotatable sleeve, and a link connection between said rotatable sleeve and said eccentric ring.

3. In a governor, the combination of a sleeve adapted to be adjustably fixed on a shaft, separate from the fly-wheel, said sleeve having alined short laterally projecting ears spaced apart longitudinally of the sleeve at each side thereof, a pivot pin carried by said ears, a ring constituting an eccentric pivoted inside its contour on said pin and encircling said sleeve between the ears, a sleeve rotatable on said fixed sleeve having central and direct link connection with said eccentric ring and governor weights and springs carried independently of said fixed sleeve adapted to actuate said rotatable sleeve.

4. In a governor, the combination with a shaft and a fixed fly-wheel thereon, of a split sleeve distinct from the fly-wheel, means for adjustably fixing said sleeve to the shaft, said sleeve being further provided with laterally projecting ears, spaced longitudinally thereof, a pin mounted at its ends in said ears, an eccentric ring having a long extension hub pivotally mounted on said pin between said ears, a second sleeve mounted on said fixed sleeve at one side of said eccentric ring connected with the latter and governor weights and springs carried by the fly-wheel operatively connected to rotate said second sleeve.

5. In a governor, the combination with a sleeve adapted to be adjustably fixed on a shaft separate from the fly-wheel, of an eccentric ring pivotally carried inside its contour by said fixed sleeve, encircling the latter, a second sleeve mounted to rotate on the fixed sleeve, governor weights and springs mounted independently of said fixed sleeve and connected up with said rotatable sleeve, and a link pivoted at one end to said sleeve and at the other end to said eccentric ring, lying within the latter.

6. In a governor, the combination with a shaft and a fixed fly-wheel thereon, of a sleeve distinct from the fly-wheel adapted to be adjustably fixed on the shaft, an eccentric ring encircling said fixed sleeve and carried thereby, having its pivotal axis within its contour, a second sleeve rotatably mounted on the fixed sleeve at one side of said eccentric ring, governor weight levers mounted to rotate with the fly-wheel, links connecting said levers and the rotatable sleeve disposed approximately centrally of said sleeve and a link connecting said rotatable sleeve and the eccentric ring lying substantially in the central plane of the latter.

7. In a governor, the combination with a shaft, a fly-wheel thereon, governor weight arms and springs mounted at one side of the fly-wheel, of a sleeve distinct from the fly-wheel fixed on the shaft, an eccentric ring pivotally carried within its contour by said fixed sleeve and encircling the latter, a second sleeve rotatably mounted on the fixed sleeve connected up with the eccentric ring, both of said sleeves and said eccentric ring being located at the opposite side of the fly-wheel, short shafts journaled in the fly-wheel carrying at one end said weight arms, lever arms secured at the other end of said shafts and links connecting said lever arms and said rotatable sleeve.

8. In a governor, the combination with a sleeve adjustably fixed on the shaft separately from the fly-wheel, of an eccentric ring encircling said fixed sleeve, an extension-hub for said eccentric, the latter and the hub having their pivotal axis within the contour of the eccentric ring and supported by said fixed sleeve between the ends thereof, a second sleeve rotatable on said fixed sleeve at one side of the eccentric ring, a connection between said rotatable sleeve and the over-balanced portion of said eccentric ring, a counterweight carried by the rotatable sleeve approximately opposite said connection whereby the eccentric ring is balanced, said counter-balance weight being provided with an elongated opening permitting free travel of the rotatable sleeve relatively to said hub, and governor weights and springs pivotally carried independently of said fixed sleeve operatively connected with the rotatable sleeve.

9. In a governor, the combination with a shaft and a fixed flywheel thereon, of a split sleeve distinct from the fly-wheel adapted to be adjustably fixed to the shaft, a split eccentric ring encircling and pivotally carried by said fixed sleeve, the pivotal axis thereof being within its contour, said eccentric ring being provided with an extension hub at one side thereof, a second split sleeve rotatable on said fixed sleeve at one side of said eccentric ring, a link pivotally connecting said rotatable sleeve and the over-balanced portion of the eccentric, lying within the latter, a counterweight extending from said rotatable sleeve approximately opposite the point of connection of said link with the rotatable sleeve, whereby the eccentric is counterbalanced, the attaching portions between said counterbalance weight and said rotatable sleeve which straddle said eccentric hub, being spaced to permit freedom of motion of the latter relatively to the rotatable sleeve, said last-named sleeve and counterweight being split, thereby affording means of attachment or detachment independent of all of said other elements, and governor weights and springs pivotally mounted on the fly-wheel operatively connected up with the rotatable sleeve.

Signed at the borough of Manhattan, in the county of New York and State of New York this 18th day of April A. D. 1911.

HARRY V. HUNT.

Witnesses:
 H. C. KARLSON,
 W. H. GEE.

---

Copies of this patent may be obtained for five cents each, by addressing the "Commissioner of Patents. Washington, D. C."